United States Patent

Komatsu

[11] Patent Number: 5,818,882
[45] Date of Patent: Oct. 6, 1998

[54] FREQUENCY OFFSET CANCELLATION APPARATUS

[75] Inventor: Masahiro Komatsu, Tokyo, Japan

[73] Assignee: NEC Corporation, Tokyo, Japan

[21] Appl. No.: 593,688

[22] Filed: Jan. 29, 1996

[30] Foreign Application Priority Data

Jan. 31, 1995 [JP] Japan .................................. 7-034317

[51] Int. Cl.$^6$ .................................................. H04L 27/06
[52] U.S. Cl. ........................ 375/344; 375/375; 455/192.1; 455/192.2
[58] Field of Search .................................... 375/344, 343, 375/375; 455/192.1, 192.2, 164.1, 150.1, 182.1, 182.2; 370/480, 491

[56] References Cited

U.S. PATENT DOCUMENTS

| 4,841,544 | 6/1989 | Nuytkens . | |
|---|---|---|---|
| 5,159,282 | 10/1992 | Serizawa et al. | 375/344 |
| 5,287,388 | 2/1994 | Ogura et al. | 455/192.2 |
| 5,361,276 | 11/1994 | Subramanian . | |
| 5,412,695 | 5/1995 | Murata | 375/344 |
| 5,535,441 | 7/1996 | Jackson et al. | 455/192.1 |
| 5,546,433 | 8/1996 | Tran et al. | 375/344 |
| 5,610,939 | 3/1997 | Takahashi et al. | 375/343 |

FOREIGN PATENT DOCUMENTS 219832  9/1987  Japan .

OTHER PUBLICATIONS

"A Coherent Spread–Spectrum Diversity–Receiver with AFC for Multipath Fading Channels," *IEEE Transactions on Communications*, 42(1994) Feb./Mar./Apr., No. 2/3/4, New York, U.S., pp. 1300–1311.

*Primary Examiner*—Wellington Chin
*Assistant Examiner*—Congvan Tran
*Attorney, Agent, or Firm*—Sughrue, Mion, Zinn, Macpeak & Seas, PLLC

[57] ABSTRACT

A frequency offset cancellation apparatus which reduces the quantity of computations to cancel a frequency offset and decreases a processing time required for the computation. The frequency of a received high frequency signal is changed by frequency converting circuit 1 and local oscillator 2 to produce a base band signal, and converts it into a digital signal by A/D convertor 3. Correlation value signals obtained by despread the digitized base band signal with spread code shifted from inputted base band signal with respect to time are inputted to detecting circuit 5a to 5n. The detection signals from detection circuit 5a to 5n are combined by combining circuit 6. Frequency offset detection circuit 7 compares the output signal inputted from combining circuit 6 with a theoretical value of a known pilot signal portion whereby a frequency offset is detected. Frequency offset cancellation circuit 8 rotates the output signal from combining circuit 6 reversely based on the value of the frequency offset. Thus, the frequency offset of the output signal from combining circuit 6 is canceled by frequency offset cancellation circuit 8 so that an output signal, the frequency offset of which is canceled, is provided.

7 Claims, 8 Drawing Sheets

FREQUENCY OFFSET CANCELLATION APPARATUS

BACKGROUND OF THE INVENTION

1. Field of the Invention

The present invention relates to a frequency offset cancellation apparatus which is utilized for a receiver and the like used in a base station of a mobile communication system using a Code-Division Multiple Access (CDMA), and which serves to cancel a frequency offset produced in transmission paths lines.

2. Description of the Related Art

In this kind of receiver, frequency offsets occur from Doppler Effect due to multiple transmitting paths and from the residual frequency errors of oscillators in receivers and transmitter in spite of their cancellation by demodulators, and therefore removal of frequency offsets have been heretofore performed. In this case, since transmitting error occurs in transmitted information due to a detection error, correction of the frequency offsets must be performed.

Figure 1:
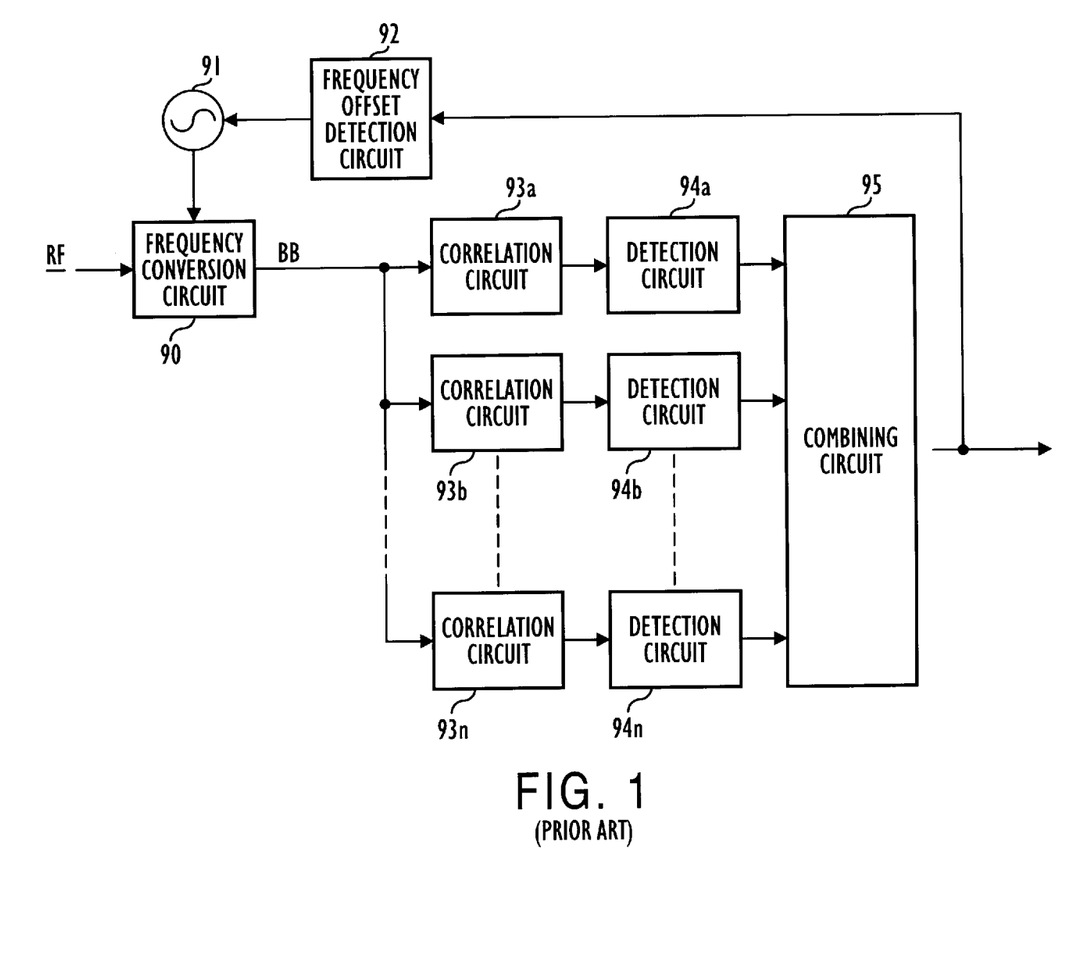
FIG. 1 is a block diagram showing a constitution of a first example of a conventional frequency offset cancellation apparatus.

FIG. 1 is a block diagram showing a constitution of a conventional frequency offset cancellation apparatus. The receiver shown in FIG. 1 is one installed in the CDMA base station that comprises a plurality of correlators to cope with multi-paths. This receiver receives signals provided from the same transmitter side with the plurality of antennas (not shown). A frequency conversion circuit 90 is provided with a received radio-frequency (RF) signal obtained by synthesizing the signals from the same transmitter. The RF signal is converted down with a local oscillating signal from a local oscillator 91. A base band (BB) signal obtained after mixing is provided to the correlation circuits 93a, 93b, . . . , 93n. The correlation circuits 93a, 93b, . . . , and 93n despread with a spread code shifted from each other with respect to time. The obtained correlation signals from the correlation circuits 93a, 93b, . . . , and 93n are provided to detection circuits 94a, 94b, . . . , and 94n.

The detection signals from the detection circuits 94a, 94b, . . . , and 94n are combined by a combining circuit 95. The output signal (combining signal) is provided to a frequency offset detecting circuit 92. The known portion of the pilot signal which is the known portion in the output signal is compared with the theoretical value whereby the frequency offset is detected. The voltage of the frequency offset value is provided to a local oscillator 91 such as a voltage control oscillator (VCO) and the like. The oscillating frequency thereof is adjusted and the frequency offset is corrected (canceled).

Figure 2:
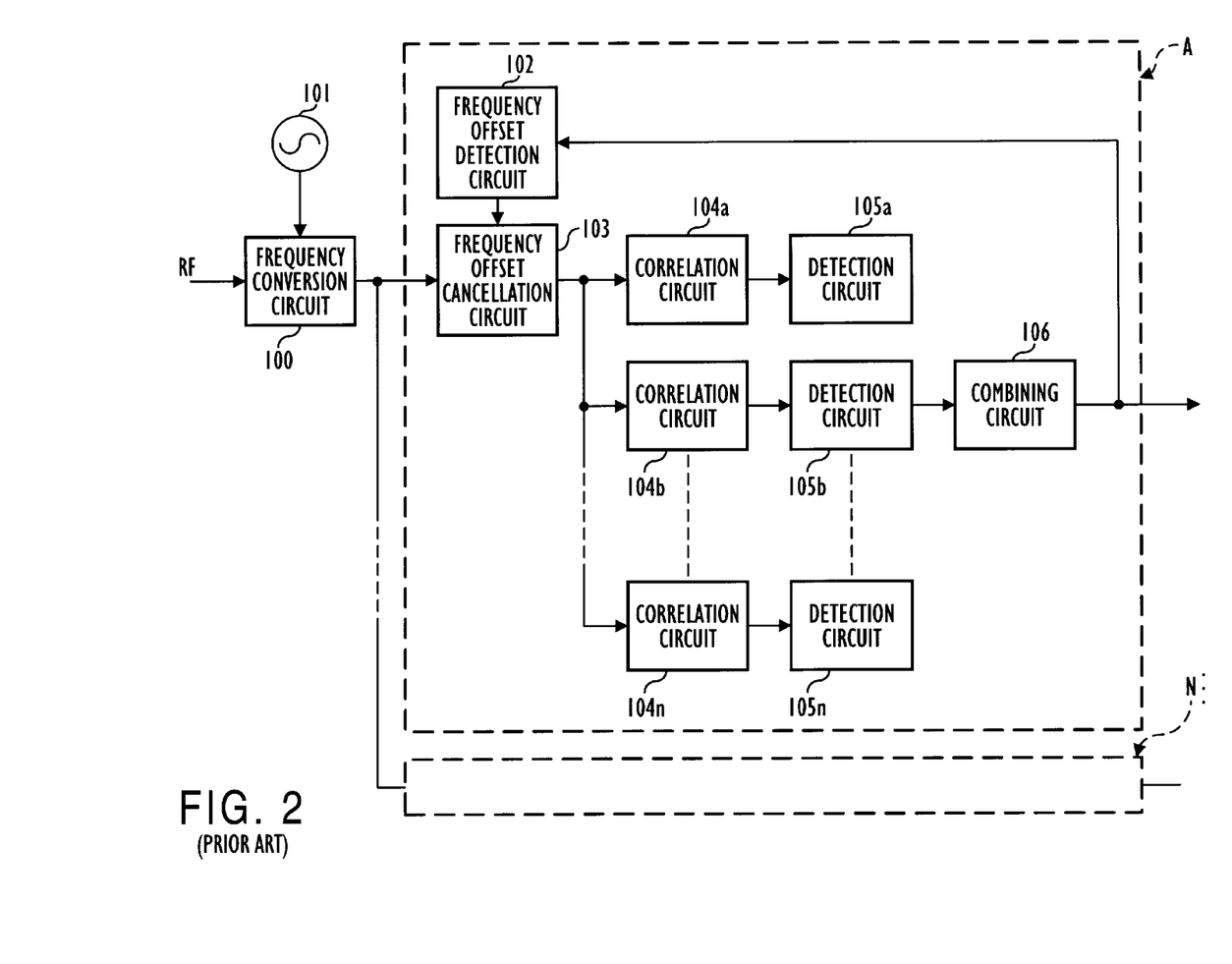
FIG. 2 is a block diagram showing a constitution of a second example of a conventional frequency offset cancellation apparatus.

FIG. 2 is a block diagram showing another constitution of the conventional offset correction apparatus.

The constitution shown in FIG. 2 shows a receiver of a CDMA base station apparatus which utilizes a received high frequency signal by dividing it into a plurality of channels. Likewise the constitution of FIG. 1, a plurality of antennas (not shown) receive a signal from the same transmitter. A received radio frequency (RF) signal such as a synthesized received signal and the like is provided to a frequency converting circuit 100. A base band (BS) signal obtained by converted down with the local oscillating signal from a local oscillator 101 is divided into a plularity of channels. The divided signals are provided to receiving demodulation sections of channels A to N, each of which transmits the output signal respectively.

Each of the receiving demodulation sections A to N of the channels has the same constitution and performs the same operation as each other. In each of the receiving demodulating processing sections A to N, a base band signal is provided to correlation circuits 104a, 104b, . . . , and 104n through a frequency offset correction circuit 103. The correlation circuits 104a, 104b, . . . , and 104n perform reverse diffusions with the diffusion symbols which are shifted from each other with respect to time. The obtained correlation signals from the correlation circuits 104a, 104b, . . . , and 104n are provided to corresponding detection circuits 105a, 105b, . . . , and 105n, respectively.

The respective detection signals from the detection circuits 105a, 105b, . . . , and 105n are combined by a combining circuit 106. The obtained output signal (combining signal) is provided to a frequency offset detection circuit 102. The frequency offset detection circuit 102 compares the known pilot signal portion of the output signal with the theoretical value to detect the frequency offset. The value of the frequency offset is provided to the frequency offset cancellation circuit 103. The frequency offset of the base band signal is canceled.

As a proposal to cancel such frequency offset, the communication path frequency offset correction apparatus has been known, which is disclosed in Japanese Patent Laid-open No. Shouwa 62-219832 (219832/1987). In this apparatus, when noises in the modulation signal during a secret communication, i.e. the frequency offset, becomes larger, the level of the noises is detected, and controlled so as to be lowered.

However, the conventional frequency offset correction apparatus is not able to use the received high frequency signal of the receiver shown in FIG. 1 in such a manner that it is divided for each of the channels. Likewise, the communication path frequency offset correction apparatus disclosed in Japanese Patent Laid-open No. Shouwa 62-219832 (219832/1987) is not also able to use the received high frequency offset cancellation signal by dividing it for each of the channels.

Although the receiver of the code division multi-access (CDMA) base station apparatus shown in FIG. 2 is able to use the received high frequency signal by dividing it for a plurality of channels, the base band signal obtained by the frequency offset cancellation circuit 103 is at a high speed. Therefore, it needs very many computations which take long time, when the frequency offset is canceled by sampling. For example, in case of the chip rate of 128 chips/symbol, the computation of 7.68 M chips/sec is needed even when the symbol rate is 60K/sec. Accordingly, there is a drawback in that data transmission at higher speed is impossible.

The object of the present invention is to provide a frequency offset cancellation apparatus which solves the drawbacks of such prior art, shortens the processing time by reducing the quantity of the computations for the frequency offset cancellation thereby achieving high speed data transmission.

SUMMARY OF THE INVENTION

To achieve the above object, a frequency offset correction apparatus of a first aspect of the present invention comprises a receiving means for outputting a base band signal obtained by demodulating a received high frequency signal; an A/D converting means for converting the base band signal inputted from the receiving means to a digital signal; a plurality of correlation processing means for producing correlation signals obtained by diffusing reversely the digital base band signal received from the A/D converting means with the diffusing signals which is shifted from the inputted base band signal with respect to time; a plurality of detecting means for detecting the correlation signals inputted from corresponding correlation processing means; a combining means for synthesizing detection signals inputted from detection means by adding them; a frequency offset detection means for detecting the value of a frequency offset of a signal from the combining means, using a known portion of the signal; and a frequency offset cancellation means for canceling the frequency offset which is detected by the frequency offset detection means.

A frequency offset cancellation apparatus of a second aspect of the present invention has a feature that each of the aforementioned detection means comprises a delay circuit which delays the correlation signal from the corresponding correlation processing means for equivalent amount of one symbol length; and a multiplication section which multiplies the correlation signal inputted from the corresponding correlation processing means by the correlation signal delayed for equivalent amount of one symbol inputted from the delay circuit, to produce a detection signal, and perform a delay detection.

A frequency offset cancellation apparatus of a third aspect of the present invention has a feature that each of the aforementioned detection means comprises a detection circuit; and a multiplication section which delays an estimated fading vector for the equivalent amount of one symbol, converts the fading vector into a conjugate complex form, and produces a detection signal obtained by multiplying the fading vector converted into the conjugate complex form by a correlation signal inputted from a correlation circuit, and performs a coherent detection.

A frequency offset cancellation apparatus of a fourth aspect of the present invention has a feature that the aforementioned frequency offset detection means comprises a known signal theoretical value generating section which generates the theoretical value of the known signal; a first conjugation section which produces a signal obtained by converting the theoretical value of the known signal from the known signal theoretical value generating section into a conjugate complex form; a third multiplication section which detects the phase shifting of the known portion of the signal combined by the combining means, inputted from the signal converted into the conjugate complex form by the first conjugation section; an n symbol delay section which delays a phase shifting signal from the third multiplication section for the equivalent amount of n symbols; a second conjugation section which converts the phase shifting signal, delayed for the equivalent amount of n symbols by the n symbol delay section, into the conjugate complex form; a fourth multiplication section which multiplies the phase shifting signal from the multiplication section by the signal converted into the conjugate complex form from the second conjugation section; an integration section which integrates rotation vectors equivalent to the number of symbols obtained by subtracting n from the number of the symbols given by the second multiplication section; a vector/angle converting section which converts the rotation vector integrated by the integration section into an angle; a 1/n multiplication section which divides the rotation angle between n symbols by the number of the symbols to obtain a rotation angle per one symbol; an angle/vector converting section which converts the rotation angle per one symbol into a frequency offset vector of a norm 1; and a holding section which holds the frequency offset vector until a subsequent frequency offset vector is obtained.

A frequency offset cancellation apparatus of a fifth aspect of the present invention has a feature that the aforementioned frequency offset detection means comprises a fifth multiplication section which multiplies a frequency offset cancellation vector by a frequency offset vector; a holding section which holds the frequency offset cancellation vector; a conjugation section which converts the vector, obtained by the fifth multiplying section, into a complex conjugate complex form; and a sixth multiplication section which produces an output signal obtained by multiplying the vector, converted into the conjugate complex form by the conjugation section, by the combining signal from the combining means.

A frequency offset cancellation apparatus of a sixth aspect of the present invention has a feature that the aforementioned frequency offset cancellation means comprises a conjugation section which converts a frequency offset vector from a frequency offset detection means into a conjugate complex form; and a seventh multiplication section which produces an output signal obtained by canceling a frequency offset, the frequency offset being obtained by multiplying a signal synthesized by a combining means by a frequency offset vector converted into a conjugate complex form by the conjugation section.

These frequency offset correction apparatuses of the present invention can be used preferably for a symbol dividing multiple transmitting demodulator.

The frequency offset correction apparatuses of the first to sixth aspects of the present invention are applied to the symbol dividing multiple transmitting demodulator. The frequency offset correction apparatuses of the first to sixth aspects of the present invention detect the correlation signals which are obtained by despreading the sampled base band signal with the spread code shifted from each other with respect to time, and sum up the detected signals to combine them. The value of the frequency offset is detected using the known combined signal. The detected frequency offset is corrected by canceling. Specifically, the frequency offset is detected by the combined data of a low speed, and the output signal is rotated reversely so that the frequency offset is canceled.

As a result, in the receiving apparatus which equips the frequency offset cancellation apparatus of the present invention, even when the number of the paths such as antennas and the like is increased, the respective frequency offsets are made equal to each other. Thus, the quantity of the computations at the time when the frequency offsets are corrected is reduced whereby the processing time for the correction is decreased. Furthermore, in the case where the quantity of the computations is previously decided, the signals through more paths can be combined, thereby increasing the quality of the received signal. Still furthermore, the frequency offset cancellation apparatus of the present invention possesses an ability to cope with the case where one received high frequency signal is used for a plurality of channels.

BRIEF DESCRIPTION OF THE DRAWINGS

The present invention is illustrated diagrammatically in the following drawings wherein.

DETAILED DESCRIPTION OF THE PREFERRED EMBODIMENTS

Embodiments of the present invention will be described with reference to the accompanying drawings in detail.

Figure 3:
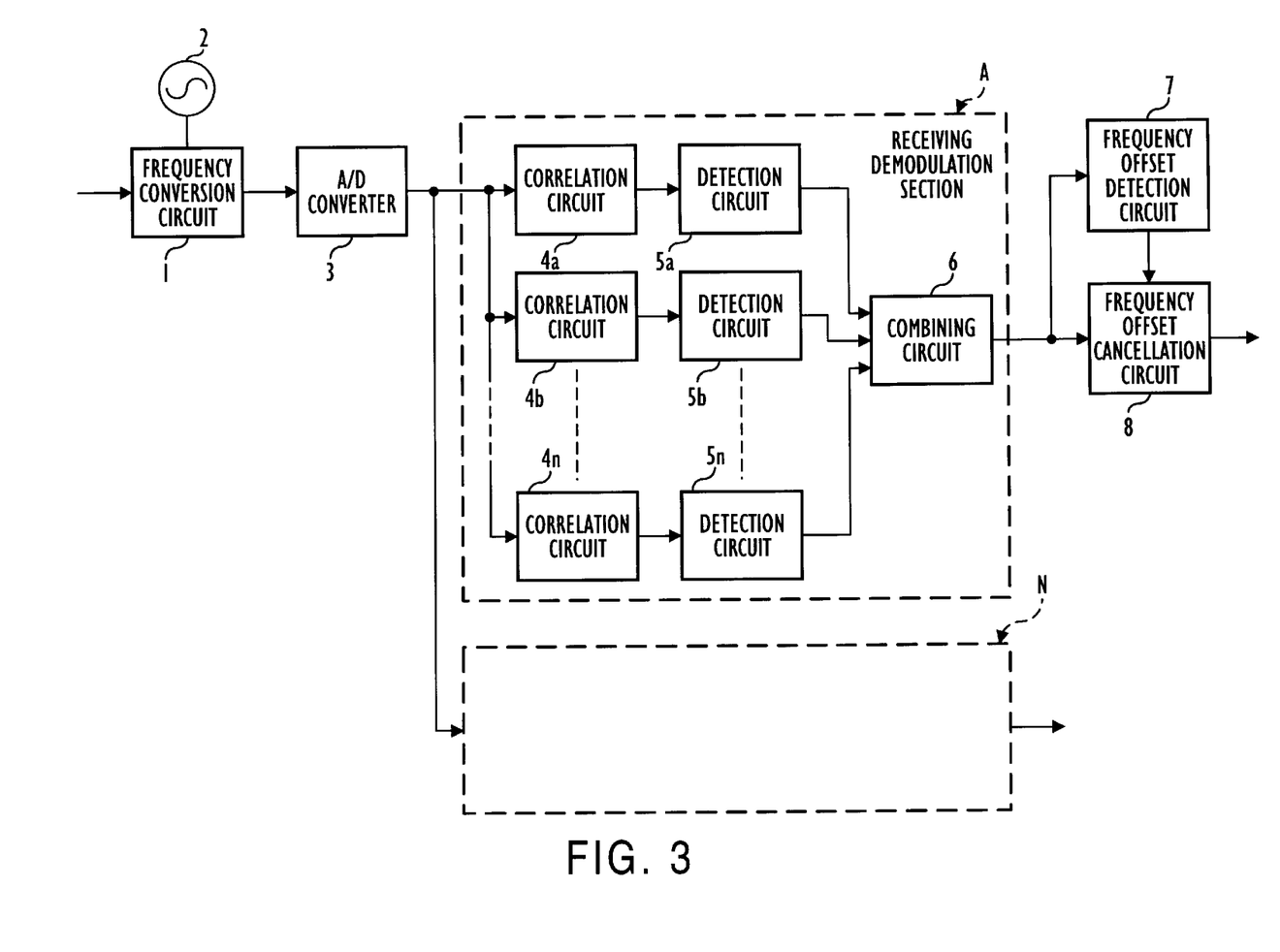
FIG. 3 is a block diagram showing a first embodiment of a frequency offset cancellation apparatus based on the present invention.

FIG. 3 is a block diagram showing a constitution of a first embodiment of a frequency offset cancellation apparatus based on the present invention.

Referring to FIG. 3, the frequency offset cancellation apparatus of the first embodiment is arranged in a receiver of a CDMA base station apparatus, the receiver detects received high frequency signal by a delay-detection and divides into a plurality of channels.

In the frequency offset correction apparatus, a frequency converting circuit 1 and a local oscillator 2 are arranged. The frequency converting circuit 1 receives signals from the same transmitter through a plurality of antennas (not shown), converting down the received radio frequency signal (RF signal) such as the combined received signal with a local oscillating signal to provide a base band (BB) signal, the base band signal being subjected to frequency conversion. The local oscillator 2 transmits the aforementioned local oscillating signal to the frequency conversion circuit 1.

Furthermore, in the frequency offset cancellation apparatus, an A/D converter 3 and receiving demodulation sections A to N are arranged. The A/D converter 3 quantizes and samples, i.e. digitizes, the base band signal, and each of the receiving/demodulation sections A to N has the same constitution and performs the demodulation for each channel. Furthermore, in the frequency offset cancellation apparatus, a frequency offset detection circuit 7 and a frequency offset cancellation circuit 8 are arranged. The frequency offset detection circuit 7 compares the known pilot signal which is the known portion of an output signal from the receiving/demodulation section with a theoretical value, thereby detecting the frequency offset. The frequency offset cancellation circuit 8 reversely turns the output signal and cancels the frequency offset based on the value of the frequency offset provided from the frequency offset detection circuit 7.

Each of the receiving/demodulation sections A to N comprises correlation circuits 4a, 4b, . . . , and 4n, detection circuits 5a, 5b, . . . , and 5n, and a combining circuit 6. Each of the correlation circuits 4a, 4b, . . . , and 4n produces a correlation value signal obtained by despread the digitized base band signal from the A/D converter 3 using the spread code shifting from each other with respect to time. Each of the detection circuits 5a, 5b, . . . , and 5n produces the detection signal by detecting the corresponding correlation value signal. The combining circuit 6 combines the detection signals from the detection circuits 5a, 5b, . . . , and 5n by combining them and outputs the combined signal.

Figure 4:
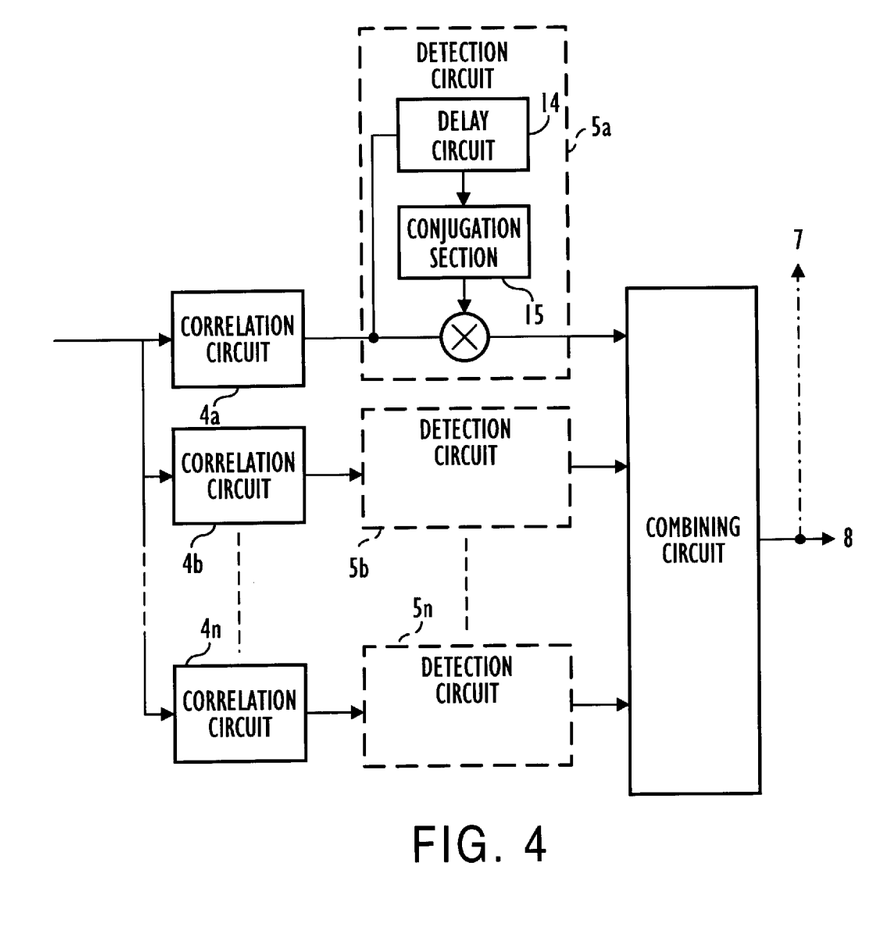
FIG. 4 is a detailed block diagram of the detection circuits shown in FIG. 3.

FIG. 4 shows a detailed block diagram of the detection circuits 5a, 5b, . . . , and 5n of FIG. 3.

Referring to FIG. 4, each of detection circuit 5a, 5b, . . . , and 5n comprises a delay circuit 14, a conjugation section and multiplication section 15. Delay circuit 14 delays the correlation value signal supplied from the corresponding one among the correlation circuits 4a, 4b, . . . , and 4n for one symbol length. The conjugaton section complexed conjugates the signal delayed one symbol length. The conjugation section converts the signal delayed one symbol length into conjugate complex form. Multiplication section 15 multiplies the correlation value signal from the corresponding correlation circuit by the signal complexed conjugated by the conjugation section, and produces a multiplication signal (detection signal).

Figure 5:
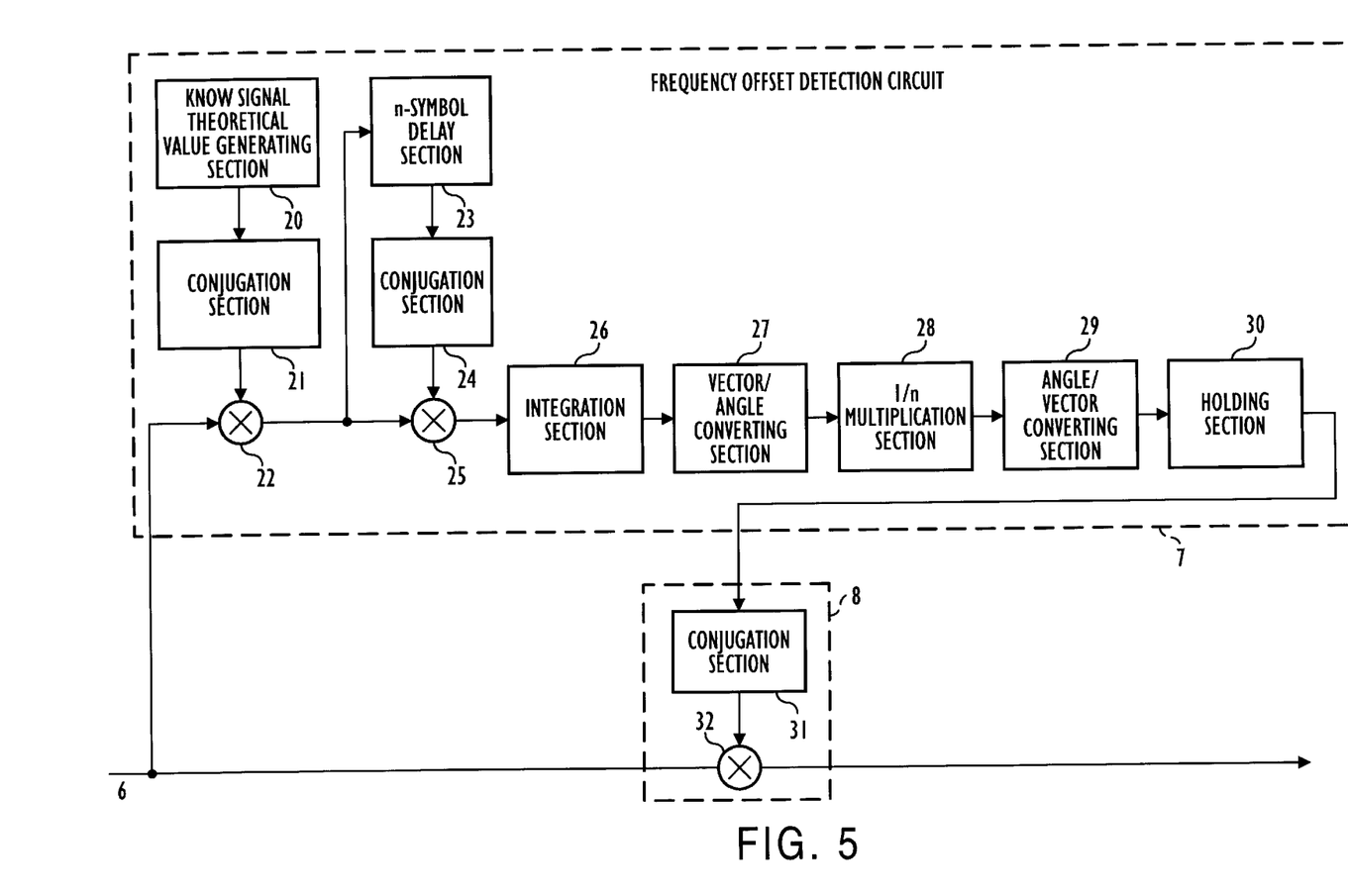
FIG. 5 is a detailed block diagram of the frequency offset detection circuit and the frequency offset cancellation circuit shown in FIG. 3.

FIG. 5 shows a detailed block diagram of frequency offset detection circuit 7 and frequency offset correction circuit 8 of FIG. 3.

Referring to FIG. 5, in the frequency offset detection circuit 7, a known signal theoretical value generating section 20 and conjugation section 21 are arranged. Known signal theoretical value generating section 20 generates a theoretical value of the known signal. Conjugation section 21 converts the theoretical value of the known signal from known signal theoretical value generating section 20 into the conjugate complex form and provides it to multiplication section 22 which is described later.

Furthermore, in the frequency offset detection circuit 7, aforementioned multiplication section 22, n-symbol delay section 23, conjugation section 24, multiplication section 25 and integration section 26 are arranged. Multiplication section 22 detects the phase shifting between the known portion of the signal obtained by combining the detecting signals and the signal converted into the conjugate complex form. N-symbol delay section 23 delays a phase shifting signal for n-symbols length. Conjugation section 24 converts the phase shifted signal delayed for n-symbols length into the conjugate form. Multiplication section 25 multiplies the phase shifted signal by the conjugated signal from conjugation section 24. Integration section 26 integrates rotation vectors equivalent to the number of the symbols that is obtained by subtracting n from the number of the symbols.

Furthermore, frequency offset detection circuit 7 comprises vector/angle converting section 27, 1/n multiplication section 28, angle/vector converting section 29, and holding section 30. Vector/angle converting section 27 converts the integrated vectors into angles. 1/n multiplication section 28 divides the rotation angle among the n-symbols by the number of the symbols to obtain the rotation angle per one symbol. Angle/vector converting section 29 converts the rotation angle per one symbol into the frequency offset vector of the norm "1". Holding section 30 holds the frequency offset vector until the subsequent frequency offset vector is obtained.

The frequency offset cancellation circuit 8 comprises conjugation section 31 and multiplication section 32. Conjugation section 31 converts the frequency offset vector inputted from frequency offset detection circuit 7 into the conjugate complex form. Multiplication section 32 multiplies the signal which is obtained by combining by the frequency offset vector received from the conjugation section 31, and transmits an output signal which is the frequency for which the offset has been corrected by the multiplication.

An operation of the first embodiment of the present invention is described hereinafter.

The received radio frequency signal (RF signal) is converted down with the local oscillation signal inputted from local oscillator 2 by the frequency converting circuit 1 to produce the base band (BB) signal. The base band signal is sampled by the A/D converter 3, and it is provided to each of the receiving/demodulation sections A to N. The sampling frequency of the A/D converter 3 is the same as that of the chip rate.

In each of receiving/demodulation sections A to N, correlation circuits 4a, 4b, . . . , and 4n provide the correlation value signals to corresponding detection circuits 5a, 5b, . . . , and 5n, which are obtained by despreading the base band signal with the spread code shifted from each other with respect to time. It should be noted that the correlation signals are obtained by integrating the quantity equivalent to one symbol that is given by multiplying the digitized base band signal from the A/D converter 3 by the spread signal.

In detection circuits 5a, 5b, . . . , and 5n, the detection is performed by multiplying the conjugate complex of the signal preceding by one symbol. In each of delay circuits 14 shown in FIG. 4, the correlation value signal from each of correlation circuits 4a, 4b, . . . , and 4n is delayed for one symbol length, and the delayed correlation value signal is multiplied by the correlation value signal by multiplication section 15.

The detection signals from detection circuits 5a, 5b, . . . , and 5n are synthesized by the summing/synthesizing circuit 6, and the combined output signal is produced therefrom. This output signal is provided to frequency offset detection circuit 7. The known pilot signal portion of the output signal is compared with the theoretical value. Hence, the frequency offset of the output signal is detected, and the frequency offset is provided to frequency offset cancellation circuit 8. In frequency offset cancellation circuit 8, the output signal from combining circuit 6 is reversely turned based on the value of the frequency offset from frequency offset detection circuit 7. Hence, the frequency offset of the output signal is corrected. Subsequently, the output signal is sent out from frequency offset cancellation circuit 8.

In this case, in frequency offset detection circuit 7 shown in FIG. 5, the conjugation section 21 converts the theoretical value of the known signal received from known signal theoretical generating section 20 into conjugate complex form. Multiplication section 22 multiplies the signal converted into the conjugate complex form by the known portion of the combined signal inputted from combining circuit 6. Hence, the phase shifting is detected. On the other hand, n symbol delay circuit 23 delays the signal, representing the phase shifting, for n symbols. This delayed signal is converted into the conjugate complex form by conjugation section 24. Multiplication section 25 multiplies the delayed signal converted into the conjugate complex form by the signal representing the phase shifting inputted from multiplication section 22. Further, integration section 26 integrates the rotation vector equivalent to the number of the symbols that is obtained by substracting n from the number of the symbols of the known signal.

The vector integrated by integration section 26 is converted into an angle by vector/angle converting section 27. The rotation angle between the n symbols is given from this conversion. This angle is divided by the number of the symbols by 1/n multiplication section 28, thereby obtaining the rotation angle per one symbol. Further, the rotation angle per one symbol is converted into the frequency offset vector of norm "1" by angle/vector converting section 29. The obtained frequency offset vector is held by the holding section 30 until the subsequent frequency offset vector is obtained. In the manner as described above, the frequency offset is detected.

For example, supposing that the number of the symbols of the pilot signal is 5, the number of the data symbols between a pilot signal and the subsequent pilot signal is 70, and n=2, the rotation vector between the first and third symbols of the pilot signal is obtained. Next, the rotation vector between the second and fourth symbols of the pilot signal is obtained. Finally, the rotation vector between the third and fifth symbols of the pilot signal is obtained. These three rotation vectors are integrated. Further, the rotation vectors are converted into the angles, and multiplied by ½. Then, it is converted into the vector. Thus, the frequency offset vector can be obtained. The data of the frequency offset vector of the 75 symbols is held by holding section 30.

In frequency offset correction circuit 8, since the signal that is combined in the frequency offset detection circuit 7 is rotated for the quantity equivalent to the frequency offset, we make all the symbols of signals reversely rotate for the quantity equivalent to the frequency offset. Specifically, the frequency offset vector is converted into the conjugate complex form by conjugation section 31, and it is multiplied by the combined signal from combining circuit 6 by multiplication section 31. Thus, the output signal wherein the frequency offset is corrected is obtained.

Next, a second embodiment of the frequency offset cancellation apparatus of the present invention is described hereinafter.

Figure 6:
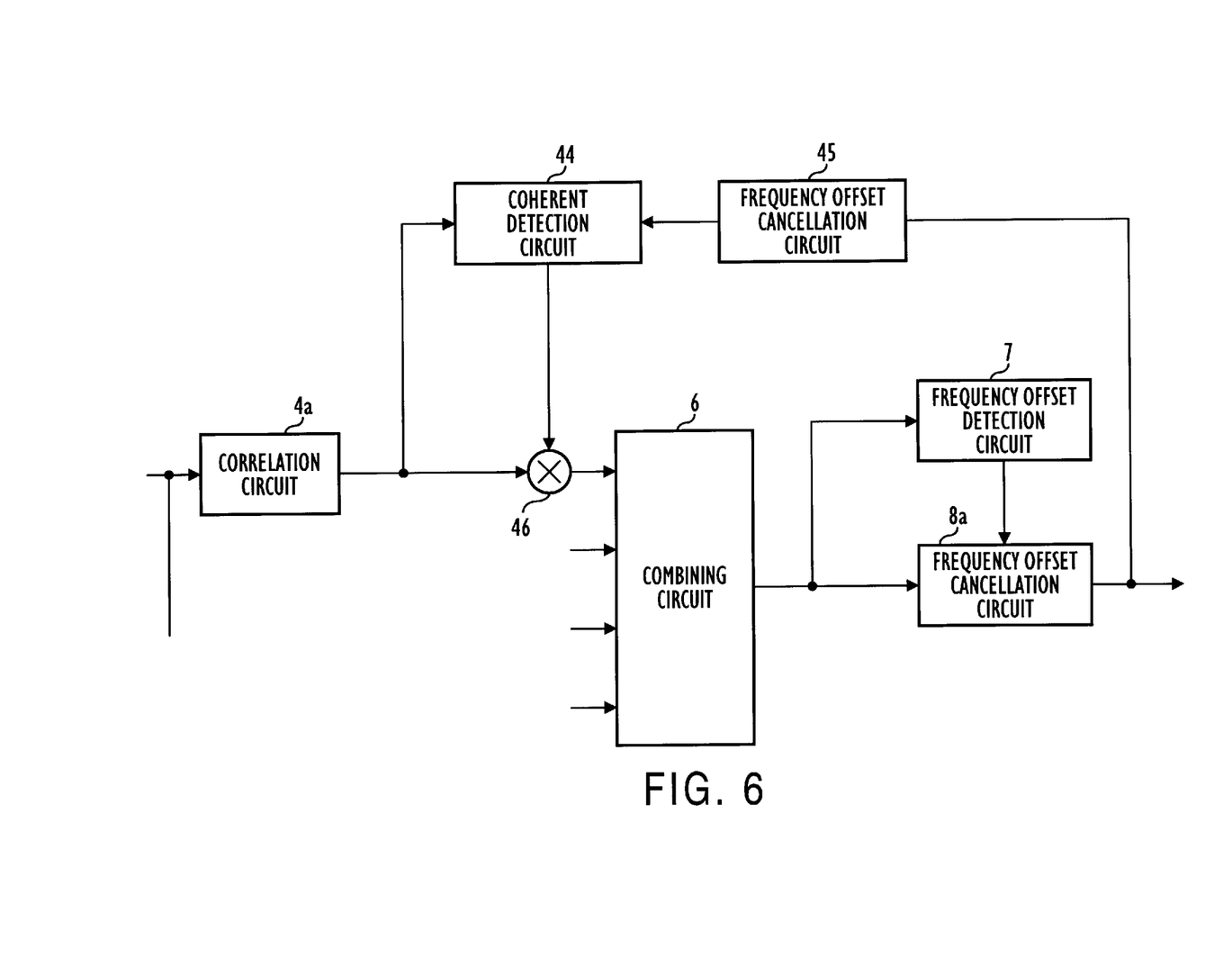
FIG. 6 is a block diagram of a second embodiment of a frequency offset cancellaiton apparatus based on the present invention.

FIG. 6 is a block diagram showing a constitution of the second embodiment of the frequency offset cancellation apparatus based on the present invention.

Figure 7:
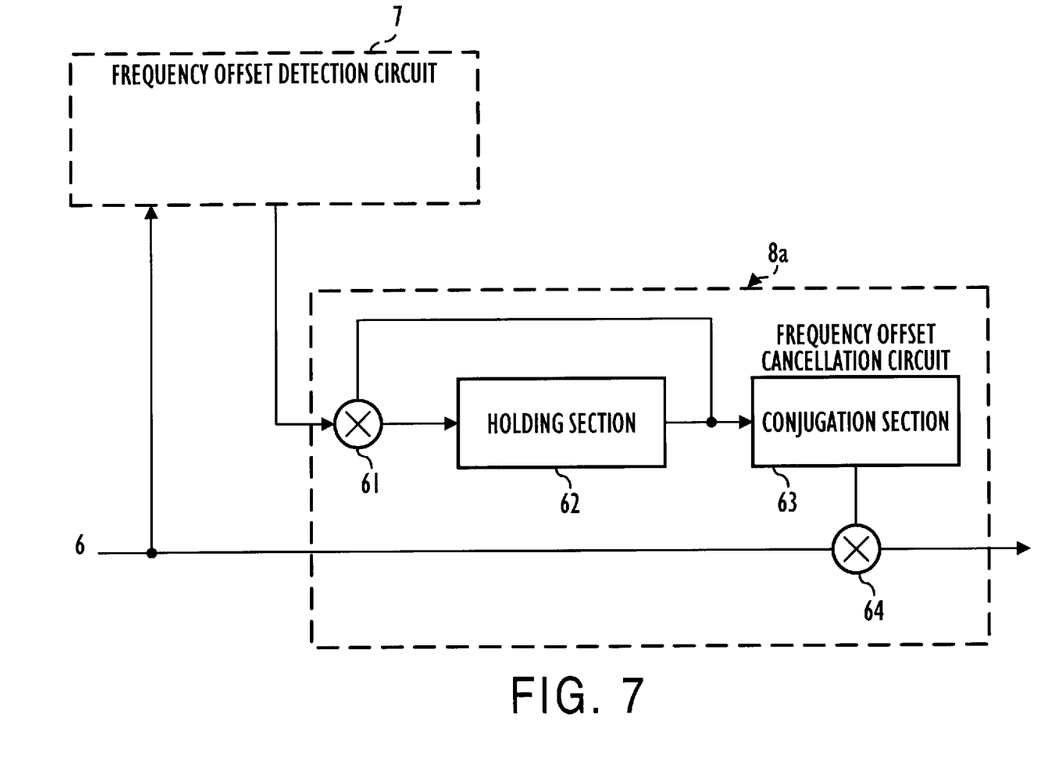
FIG. 7 is a detailed block diagram of the frequency offset cancellation apparatus shown in FIG. 6.

The frequency offset cancellation apparatus shown in FIG. 6 being employed in the receiver of the CDMA base station apparatus, performs the sequence following-up synchronizing detection for the received high frequency signal and divides the received high frequency signal for a plurality of channels. Specifically, the constitution of frequency offset cancellation circuit 8a of the second embodiment shown in FIG. 7 is similar to the construction of frequency offset cancellation circuit 8 of the first embodiment shown in FIG. 5. As the detail constitution of the frequency offset cancellation/decision circuit 45 is shown in FIG. 8, the frequency offset cancellation/decision circuit 45 is arranged, which performs the frequency offset cancellation and decision for the output signal from the frequency offset cancellation circuit 8a.

Figure 8:
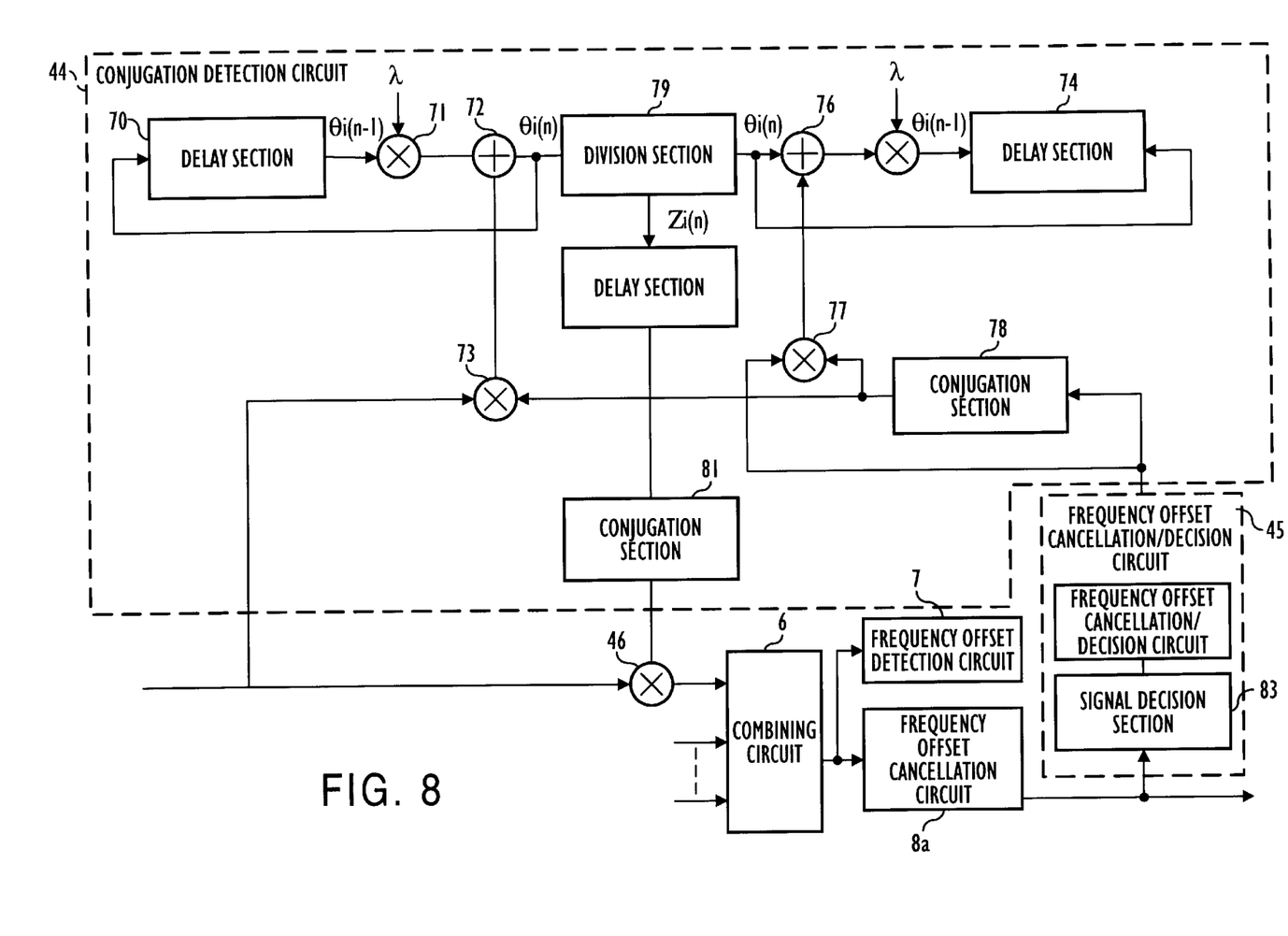
FIG. 8 is a detailed block diagram of the coherent detection circuit 44 and the frequency offset cancellation/decision circuit.

Furthermore, as shown in detail in FIG. 8, there are provided coherent detection circuit 44 corresponding to detection circuits 5a, 5b, . . . , and 5n of the first embodiment and multiplication section 46. The coherent detection circuit 44 performs the coherent detection using RLS (Recursive Least Squares) estimate for phase and amplitude, and the multiplication section 46 produces the detection signal. The detection signal is obtained by multiplying the correlation signal by the signal received from conjugation section 81 described later. This signal is given by delaying the estimated fading vector Z (n) for one symbol length and by converting it into the conjugate complex form. Since the function blocks other than the function blocks described above are the same as those of FIG. 3, explanations are omitted.

FIG. 7 is a detailed block diagram of the frequency offset cancellation circuit 8a of FIG. 6.

Referring to FIG. 7, frequency offset cancellation circuit 8a comprises multiplication section 61 which multiplies the frequency offset correction vector by the frequency offset vector, and holding section 62 which holds the frequency offset cancellation vector. Furthermore, frequency offset cancellation circuit 8a comprises conjugation section 63 which converts the vector multiplied by multiplication section 61 into the conjugate complex form, and multiplication section 64 which multiplies the vector converted into the conjugate complex form by the signal obtained by adding and synthesizing.

It is noted that the constitution of the frequency offset detection circuit 7 in FIG. 7 is the same as that shown in FIG. 5. Explanation of frequency offset detection circuit 7 in FIG. 7 is described hereinafter using FIG. 5.

FIG. 8 is a detailed block diagram of coherent detection circuit 44 and frequency offset cancellation/decision circuit 45, shown in FIG. 6.

Referring to FIG. 8, coherent detection circuit 44 comprises delay section 70 which delays a combined signal θi (n), and a multiplication section 71 which multiplies the weighting correlation θi (n−1) by λ, where θi (n−1) is the sum of the correlation value signal i and the decision signal o accumulated until the last symbol, and output the multiplication result.

Furthermore, coherent detection circuit 44 comprises addition section 72 which adds the correlation value signal i at the last symbol to the signal multiplied by λ by the multiplication section 71, multiplication section 73 which multiplies the correlation signal i by the signal converted into the conjugate complex form, delay section 74 which delays the signal φi (n) obtained by adding the decision signal o to the signal which is obtained by multiplying the weighting sum φi (n−1) by λ and multiplication section 75 which multiplies weighting sum φi (n−1) of norm of decision signal o accumulated until the last symbol by λ and summing section 76 which adds the decision signal o to the weighting sum φi (n−1) by λ.

Furthermore, in coherent detection circuit 44, there are provided with the multiplication section 7 which multiplies the decision signal by the signal converted into the conjugate complex form, and conjugation section 78 which performs the conjugate complex conversion to obtain the cross correlation between the decision signal o and the correlation value signal i. In addition, coherent detection circuit 44 comprises the division section 79 which divides the signal θi (n) by the signal φi (n) to obtain the estimated fading vector Zi (n), the delay section 80 which delays the estimated phasing vector Zi (n) by the quantity equivalent to one symbol, and conjugation section 81 which converts the estimated phasing vector Zi (n), delayed for one symbol length, into the conjugate complex form.

The frequency offset cancellation/decision circuit 45 comprises the frequency offset correction section 82 and the signal decision section 83 which obtains the decision signal 0 multiplied by the frequency offset vector in the case other than the known signal. The frequency offset cancellation section 82 rotates the theoretical value by the quantity equivalent to the frequency offset to output it as the decision signal o in the known pilot signal and the like, and decides whether the output signal through the frequency offset cancellation circuit 8a is positive or negative, in the case other than known signal.

Next, an operation of the second embodiment of the frequency offset cancellation apparatus of the present invention is described hereinafter.

The operations of the second embodiment performed by frequency converting circuit 1 to correlation circuit 4a in FIG. 6 are the same as those of FIG. 3. Specifically, the received high frequency signal is subject to frequency conversion. The obtained base band signal is converted into the digital signal. The digital signal is demodulated by the receiving demodulation processing sections having the same constitution, which perform the demodulations of the signals distributed to the corresponding channels. The received demodulation processing sections are the same as those in FIG. 3. Further, the frequency offset is detected by frequency offset detection circuit 7, and the output signal, in which the frequency offset is canceled based on the value of the frequency offset by frequency offset cancellation circuit 8a, is transmitted.

An operation of the coherent detection circuit is described hereinafter.

The coherent detection circuit decides signal o estimated as being transmitted (received high frequency signal) based on detected signal y shown in FIG. 8. Calculating correlation between this decision signal o and the correlation value signal i, the coherent detection circuit estimates a fading signal sequentially. Multiplying this estimation signal Z by the correlation signal i, the coherent detection circuit performs the coherent detection using RLS estimator for phase and amplitude.

First, referring to FIG. 8, to obtain the correlation between the correlation signal i and the decision signal o, the correlation signal i is multiplied by the signal which is converted into the conjugate complex form by conjugation section 78 using multiplication section 73. In addition, the weighting correlation sum θi (n−1) of the preceding correlation signal i and the decided signal o accumulated until the last symbol is multiplied by λ using multiplication section 71. Thereafter, the signal from the multiplication section 71 and the signal from the multiplication section 73 are added by addition section 72. Thus, the sum θi (n) is obtained, and it is delayed by delay section 70. The sum θi (n) is used as θi (n−1) for the computation at the time of the subsequent symbol.

Similarly, to obtain the norm of the decision signal o, multiplication section 77 multiplies the decision signal o by the signal converted into the conjugate complex form by conjugation section 78. In addition, the multiplication section 75 multiplies the norm weighting sum S (n−1) of the decision signal o accumulated until the last symbol by λ. Addition section 76 adds the signal inputted from multiplication section 77 to the signal inputted from multiplication section 75 to obtain the sum θi (n). The sum θi (n) is delayed by delay section 74. The sum θi (n) is used as θi (n−1) for the computation at the time of the subsequent symbol.

Since the correlation between the correlation value signal i and the decision signal o, and the norm of the decision signal are added after being weighted by exponential weighting, the estimation signals are produced according to the data of the past several symbols. By dividing θi (n) by φi(n) by division section 79, the fading vector Zi(n) is obtained. Specifically, the value of the estimated fading vector Z (n) is delayed for one symbol length using the delay section 80 converted into the conjugate complex form using the conjugation section 81 and multiplied by the correlation value signal i using multiplication section 46 so that the detection output can be obtained.

Decision signal o which is necessary for the operation of the coherent detection in coherent detection circuit 44 is inputted from frequency offset cancellaton/decision circuit 45. In frequency offset correction/discrimination circuit 45, the signal obtained by rotating the theoretical value of the known pilot signal and the like for the angle of the frequency offset is defined as the decision signal. Further, an output signal which is decided whether it is positive or negative and rotated amount of the frequency offset quantity is defined as a decided signal o.

In frequency offset cancellation/decision circuit 45, signal decision section 83 rotates the theoretical value of the known signal portion such as the pilot signal and the like for an equivalent amount of the frequency offset, and the rotated theoretical value is used as the decision signal o. In the case other than the known signal, it is decided whether the output signal passing through combining circuit 6 and frequency offset cancellation circuit 8a is positive or negative. Further, the decided output signal is multiplied by the frequency offset vector using frequency offset cancellation section 82, and it is used as the decision signal o.

As a result, the rotation of the correlation value signal i for the equivalent amount of the frequency offset is canceled at the time when the correlation between the correlation signal i and the decision signal o is obtained. Specifically, the similar results which are brought in the case where the coherent detection is performed after the correction of the frequency offset are obtained.

The coherent detection signal which is outputted from coherent detection circuit 44 and multiplication section 46 is added to other coherent detection signals by combining circuit 6 to be combined. Since this data rotates according to the frequency offset as in the first embodiment, it is reversely rotated for the equivalent amount of the frequency offset which is detected by frequency offset cancellation circuit 8a so that it is corrected.

The operation of frequency offset detection circuit 7 shown in FIG. 7 is similar to that of the first embodiment shown in FIG. 5. In frequency offset cancellation circuit 8a, the frequency of the signal obtained after the signals are combined by combining circuit 6 is offsetted for the equivalent amount of the frequency offset.

In detail, since the signal rotates for the equivalent amount of the frequency offset, the frequency offset cancellation vector held by holding section 62 is multiplied by the frequency offset vector using multiplication section 61. Then, the vector converted into the conjugate complex form by conjuconjugation section 63 is multiplied by the signal which is obtained by combined using multiplication section 64.

As a result, the same signal is obtained as the case where the frequency offset is corrected in each of the paths (receiving high frequency signal). Specifically, since the correction of the frequency offset is performed once per one symbol, the quantity of the computations is reduced, thereby decreasing the processing time, compared with the case where the frequency offset corrections are performed for each path and the case where the frequency offset cancellation is performed as to the base band signal.

As described above, in the first and second embodiments, the frequency offset is detected by the low speed data obtained by combining and the frequency offset is canceled by rotating reversely the output signal. As a result, since the frequency offset is the same in each of the paths, even when the number of the antennas is increased in order to realize the multi-path, the quantity of the computations at the time of the cancellation of the frequency offset is reduced. The processing time is reduced so that for example, data transmission with higher speed becomes possible. On the contrary, when the quantity of the computations is limited, more paths can be combined so that the quality of the receiving signal is increased. Furthermore, since the receiving demodulation processing sections A to N are provided, the frequency offset cancellation apparatus of the present invention can cope with the case where one receiving high frequency signal is distributed into the plurality of the channels.

As is clear from the above description, according to the frequency offset cancellation apparatuses of the present invention shown in FIGS. 1 to 7, detecting the respective correlation signals which are obtained by despread the digitized base band signal with the spread code shifted from each other with respect to time and the synthesize detected signals by adding. The value of the frequency offset is detected by utilizing the known portion of the combined signal and the detected frequency offset is canceled.

Since the frequency offset is canceled by the low speed data synthesized by adding, the quantity of the computations is reduced so that the processing time is decreased. Hence, the data transmission with a higher speed becomes possible.

While the embodiments of the present invention, as herein disclosed, constitute a preferred form, it is to be understood that other forms might be adopted.

What is claimed is:

1. A frequency offset cancellation apparatus, comprising:
   receiving means for outputting a base band signal which is obtained by demodulating a received high frequency signal;
   A/D converting means for digitizing said base band signal inputted from said receiving means;
   a plurality of correlation processing means for producing correlation signals, the correlation signals being obtained by despreading said digital base band signal received from said A/D converting means with spread code shifted from the inputted base band signal with respect to time;
   a plurality of detection means for performing detection operations for the respective correlation signals inputted from said correlation processing means;
   combining means for combining the respective detection signals inputted from said detection means by a summing operation;
   frequency offset detection means for detecting a value of a frequency offset using a known portion of a signal inputted from said combining means; and
   frequency offset cancellation means for removing the value of the frequency offset which is detected by said frequency offset detection means.

2. The frequency offset cancellation apparatus according to claim 1, wherein each of said detection means comprises:
   a first delay circuit which delays said correlation value signal from said correlation processing means for equivalent amount of one symbol length; and
   first multiplication means multiplying said correlation signal inputted from said correlation processing means by said correlation signal inputted from said delay circuit, thereby producing a detection signal as a result of said multiplication.

3. The frequency offset cancellation apparatus according to claim 1, wherein each of said detection means comprises;
   a coherent detection circuit which performs a coherent detection using recursive least squares RLS estimate for phase and amplitude;
   a second delay circuit which delays the estimated fading vector for equivalent amount of one symbol length;
   means for converting the estimated fading vector into a conjugate complex form, and a second multiplication means for multiplying said conjugate complex form fading vector by said correlation signal to produce a detection signal.

4. The frequency offset cancellation apparatus according to claim 1, wherein said frequency offset detection means comprises:

known signal theoretical signal value generating means for producing a theoretical value of a known signal;

first conjugation means for producing a signal obtained by converting the theoretical value of the known signal from said known signal theoretical value generating section into the conjugate complex form;

third multiplication means for detecting by multiplying the phase shifting between the known portion of a signal which is obtained by combining by the combining means, and the signal which is obtained by conversion into the conjugate complex form by said first conjugation means;

n symbol delay means which delays the phase shifting signal inputted from said third multiplication means for equivalent amount of n symbols;

second conjugation means for converting the phase shifting signal into the conjugate complex form;

fourth multiplication means for multiplying the phase shifting signal inputted from said third multiplication means by a conjugate complex converting signal from said second conjugation means;

integration means for integrating rotation vectors of the quantity equivalent to the number of the symbols which is a difference between the number of symbols inputted from said fourth multiplication section and n;

vector/angle converting means for converting the rotation vector integrated by said integration means into an angle;

1/n multiplication means for dividing the rotation angle between n symbols by the number of the symbols to obtain the rotation angle per one symbol;

angle/vector converting means for converting the rotation angle per one symbol into a frequency offset vector of norm one; and first holding means which holds the frequency offset vector until the subsequent frequency offset vector is obtained.

5. The frequency offset cancellation apparatus according to claim 1, wherein said frequency offset detection means comprises:

fifth multiplication means for multiplying a frequency offset cancellation vector by a frequency offset vector;

second holding means for holding the frequency offset cancellation vector;

third conjugation means for converting the vector obtained by said fifth multiplication means; and sixth multiplication means for multiplying the vector which is converted into the conjugate complex form by said third conjugation means by the detection signal, which is obtained by combining by said combining means.

6. The frequency offset cancellation apparatus according to claim 1, wherein said frequency offset cancellation means comprises:

fourth conjugation means for obtaining a conjugate complex form vector by converting a frequency offset vector inputted from said frequency offset detection means into the conjugate complex form; and seventh multiplication means for outputting a signal with its frequency offset removed, wherein said signal is a product of the signal, which is combined by said combining means, and said conjugate complex form vector, which is obtained by said fourth conjugation means.

7. The frequency offset cancellation apparatus according to claim 1, wherein said frequency offset cancellation means reversely turns the signal inputted from said combining means, based on the value of the frequency offset detected by said frequency offset detection means.

* * * * *

UNITED STATES PATENT AND TRADEMARK OFFICE
CERTIFICATE OF CORRECTION

PATENT NO. : 5,818,882
DATED : October 6, 1998
INVENTOR(S) : Masahiro KOMATSU

It is certified that error appears in the above-identified patent and that said Letters Patent is hereby corrected as shown below:

Column 5, line 60, delete "despread" and insert --despreading--.

Column 5, line 62, delete "shifting" and insert --shifted--.

Signed and Sealed this

Sixth Day of July, 1999

Attest:

Q. TODD DICKINSON

*Attesting Officer*  *Acting Commissioner of Patents and Trademarks*